(12) United States Patent
Verhaeghe et al.

(10) Patent No.: US 9,823,147 B2
(45) Date of Patent: Nov. 21, 2017

(54) METHOD AND SYSTEM FOR DETERMINING THE PLUNGER LOAD OF A BALER

(71) Applicants: CNH Industrial America LLC, New Holland, PA (US); KATHOLIEKE UNIVERSITEIT LEUVEN, Leuven (BE); INDUCT BVBA, Heverlee-Leuven (BE)

(72) Inventors: Didier Verhaeghe, Ieper (BE); Kenny Nona, Kessel-Lo (BE); Tom Coen, Zemst (BE)

(73) Assignee: CNH Industrial America LLC, New Holland, PA (US)

(*) Notice: Subject to any disclaimer, the term of this patent is extended or adjusted under 35 U.S.C. 154(b) by 30 days.

(21) Appl. No.: 14/890,347

(22) PCT Filed: May 8, 2014

(86) PCT No.: PCT/EP2014/059487
§ 371 (c)(1),
(2) Date: Nov. 10, 2015

(87) PCT Pub. No.: WO2014/180965
PCT Pub. Date: Nov. 13, 2014

(65) Prior Publication Data
US 2016/0109309 A1 Apr. 21, 2016

(30) Foreign Application Priority Data
May 10, 2013 (BE) .................................. 2013/0327

(51) Int. Cl.
*G01L 5/00* (2006.01)
*A01F 15/08* (2006.01)
*A01F 15/04* (2006.01)
*B62D 5/04* (2006.01)

(52) U.S. Cl.
CPC .............. *G01L 5/00* (2013.01); *A01F 15/042* (2013.01); *A01F 15/0825* (2013.01); *A01F 15/0841* (2013.01); *B62D 5/04* (2013.01)

(58) Field of Classification Search
CPC combination set(s) only.
See application file for complete search history.

(56) References Cited

U.S. PATENT DOCUMENTS

| 4,624,180 | A | 11/1986 | Strosser |
| 5,123,338 | A | 6/1992 | Mathis |
| 6,073,426 | A | 6/2000 | Mesmer et al. |
| 6,101,932 | A | 8/2000 | Wilkens |
| 8,113,114 | B2* | 2/2012 | Schlesser ............ A01D 41/1274 100/178 |
| 2002/0108508 | A1* | 8/2002 | Leupe ................. A01F 15/0825 100/45 |
| 2015/0027325 | A1* | 1/2015 | Bonte ................. A01F 15/0841 100/35 |

* cited by examiner

Primary Examiner — Edward J Pipala
(74) Attorney, Agent, or Firm — Peter K. Zacharias; Patrick M. Sheldrake

(57) ABSTRACT

A method and adapted electronic systems for determining a value representative for or an estimate of the load on a plunger of a baler for harvested agricultural material includes obtaining the speed of movement of a drive element for the plunger, followed by determining the estimate of or value representative for the load on the plunger based upon the obtained speed of movement of the drive element.

15 Claims, 10 Drawing Sheets

METHOD AND SYSTEM FOR DETERMINING THE PLUNGER LOAD OF A BALER

This application is the US National Stage filing of International Application Serial No. PCT/EP2014/059487 filed on May 8, 2014 which claims priority to Belgian Application BE2013/0327 filed May 10, 2013, each of which is incorporated herein by reference in its entirety.

FIELD OF THE INVENTION

The invention relates to methods and systems used in balers for forming bales of agricultural material, more in particular methods and systems for determining the plunger load and use of such methods and systems for controlling such balers.

BACKGROUND OF THE INVENTION

An agricultural baler is a trailed machine, typically towed behind agricultural vehicles such as tractors, used in agriculture for the purpose of forming bales of agricultural materials, such as straw, hay, silage or other biomass, produced during a harvesting or mowing operation. A baler typically comprises an infeed through which biomass is introduced into a bale-forming chamber. In the bale-forming chamber the biomass is generally compressed or otherwise treated to form bales. The completed bales are tied with twine or a similar lineal object or are packaged in another way to make them self-supporting. The bales are subsequently ejected by means of a discharge mechanism.

Referring to the drawings, FIG. 1 shows agricultural baler 600 comprising a frame 512 which is equipped with a forwardly extending tongue 514 at its front end with hitch means (not shown) for coupling the baler 600 to a towing tractor. A pick-up assembly 513 lifts windrowed agricultural material off the field as the baler 600 is travelled there over and delivers such material into the front end of a rear ward and upwardly curved, charge-forming feeder duct 515. The duct 515 communicates at its upper end with an overhead, fore-and-aft extending bale-forming chamber 516 into which agricultural material charges are loaded by a cyclically operating stuffer mechanism 517. A continuously operating packer mechanism 519 at the lower front end of the feeder duct 515 continuously feeds and packs material into the duct 515 as to cause charges of the agricultural material to take on and assume the internal configuration of the duct 515 prior to periodic engagement by the stuffer 517 and insertion up into the bale-forming chamber 516. The feeder duct 515 may be equipped with means (not illustrated) for establishing whether a complete charge has been formed therein and operating the stuffer mechanism 517 in response thereto. Each action of the stuffer mechanism 517 introduces a "charge" or "flake" of agricultural material from the duct 515 into the chamber 516. A plunger 562 reciprocates in a fore-and-aft direction within the bale-forming chamber 516. Biomass fed via the feeder duct 515 is thereby compacted, e.g. compressed or otherwise treated, so as to form bales in the above-described operation of the agricultural baler 600. Rectangular bales are formed. The completed bales are tied with twine or a similar lineal object to make them self-supporting, for example for shipping and storage. Once tied, the bales are discharged from the rear end of the bale-forming chamber 516 onto a discharge in the form of a chute, generally designated 520.

In the art the load on the plunger is either measured by load sensors or sensors that measure deformation of the bale chamber. Those sensors are expensive or require a complex set-up with careful calibration because of the high load involved. Furthermore since here the balers comprise of large structural elements of which the production tolerances are difficult to control, the required high accuracy measurements as necessary for a baler control system, are difficult to achieve.

SUMMARY OF THE INVENTION

It is an object of embodiments of the present invention to provide methods and systems used in balers for forming bales of agricultural material, more in particular methods and systems for determining the plunger load (i.e. the force exerted on the plunger) and use of such methods and systems for controlling such balers, which are simple, cheap and/or robust.

The above objective is accomplished by methods and systems according to embodiments of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

In a first aspect of the invention a method for determining a value representative for the load (e.g. an estimate of the load or a value proportional to the load) on a plunger of a baler is provided, whereby the baler at least comprises a drive system for the plunger, the drive system comprising at least one moving drive element. The method comprises a step of obtaining (e.g. receiving) the speed of movement of the drive element, followed by determining the estimate of or value representative for the load on the plunger based upon the obtained speed of movement of the drive element by use of a predetermined relationship between this speed of movement of the drive element and the load on the plunger.

In a first embodiment of the first aspect, the predetermined relationship is a function or a set of (one or multi-dimensional) functions (e.g. a linear function or any other polynomial fitted through the available data) between the load on the plunger and the speed of movement of the drive element.

In an embodiment of the first aspect, the predetermined relationship is selected in accordance with obtained (e.g. input by the operator or on-line measured values like agricultural material humidity) agricultural material characteristics of the agricultural material being baled by the baler. This is advantageous as it permits to take into account the nature of the baled agricultural material, which leads to more accurate load values.

In an embodiment of the first aspect the method may further comprise of a step of determining (e.g. from measurements on the bale chamber of the baler) whether the plunger is operating under a first condition (called active cycles) wherein the plunger is moving and compressing agricultural material in the baler or under a second condition (called passive cycles) wherein the plunger is only moving new agricultural material in the baler without compressing the new agricultural material therein; and the predetermined relationship is then selected in accordance with the determined condition. This is advantageous as it permits to take into account the nature of the cycle within the baler, which leads to more accurate load values.

In an embodiment of the first aspect of the invention the drive system for the plunger comprises a first subsystem, capable of obtaining an external driving force and adapted for directing a portion of this external driving force to a second subsystem specific for the plunger and the method is then further characterized in that the drive element is part of the second subsystem.

In another embodiment of the invention the drive system is operatively connected to at least one other baler component (e.g. the stuffer or the knotter) and the method then further comprises obtaining a signal indicative on whether the one (or more) other bale component(s) is (are) actually driven by the drive system at the time instance of determining the load of the plunger and the method is further characterized in that the step of determining the load of the plunger takes into account this indicative signal. This is advantageous as it permits to take into account the reparation of power amongst various baler components, which leads to more accurate load values.

In another embodiment of the invention the predetermined relationship is based on one or more differential equations (e.g. a set of first order differential equations) describing at least the dynamics of the plunger, the second drive sub-system, and optionally even a model of the compression behavior of the agricultural material, these equations including the load on the plunger and the rate of change of the speed of movement of the drive element.

In another embodiment of the first aspect, a model-based estimator is used for determining the value representative for or an estimate of the load of the plunger, whereby the model is based on the (set of) differential equation(s).

In another embodiment of the invention the second drive sub-system comprises a flywheel, operatively connected to the plunger, and the drive element (the speed of which is used for the determining the plunger load) is purposely chosen to be the flywheel. This is advantageous as speed measurements on the flywheel are accurate and easily performed, and therefore permit more accurate load estimates.

In a second aspect of the present invention, a method for determining a control signal for controlling the load on a plunger of a baler is provided, the method comprising the steps of obtaining a value representative for or an estimate of the load on the plunger determined in accordance with any of the methods disclosed above and further determining a control signal based on the obtained value representative for or an estimate of the load on the plunger (e.g. by comparing the obtained estimate with a reference maximum load of the plunger).

In a third aspect of the present invention, a method is provided for controlling the load on a plunger of a baler with at least one controllable element for controlling said load, steered by an actuator, the method comprising the steps of determining a control signal; followed by applying the control signal to the actuator of the controllable element.

These second and third aspects are advantageous as they permit to keep load automatically at a proper level.

In a fourth aspect of the invention a system used in a baler is provided, the system comprising a first electronic device for determining a value representative of or an estimate of the load on a plunger of the baler driven by a drive system with at least one drive element, the first electronic device comprising a means for obtaining the speed of movement of the drive element; a storage means for storing data (parameters) about a predetermined relationship between the speed of movement of the drive element and the load on the plunger; and a computation means for determining the value representative of or the estimate of the load on the plunger based upon the obtained speed of movement of the drive element by use of the stored predetermined relationship between this speed of movement of the drive element and the load on the plunger.

In an embodiment of this fourth aspect of the invention further a sensor, operatively connected to the first electronic device and used for measuring the speed of movement of the drive element, is provided.

In a further embodiment thereof the system is further adapted for determining a control signal for controlling the load on a plunger of a baler, the system comprising a second electronic device comprising a storage means for storing a reference maximum load of the plunger and computation means for determining a control signal based on the obtained value representative for or an estimate of the load on the plunger by use of a comparator for comparing the obtained value representative of or an estimate of the load of the plunger with the stored reference maximum load of the plunger.

In yet a further embodiment thereof the system is further being adapted for controlling the load on a plunger of a baler as the system comprises one controllable element of the baler for controlling the load thereof; and an actuator, operatively connected to the controllable element for steering in accordance with the control signal.

In a further aspect, the present invention relates to a computer program product that, when executed on computing means, provides instructions for executing any one method of the first three aspects of the present invention.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
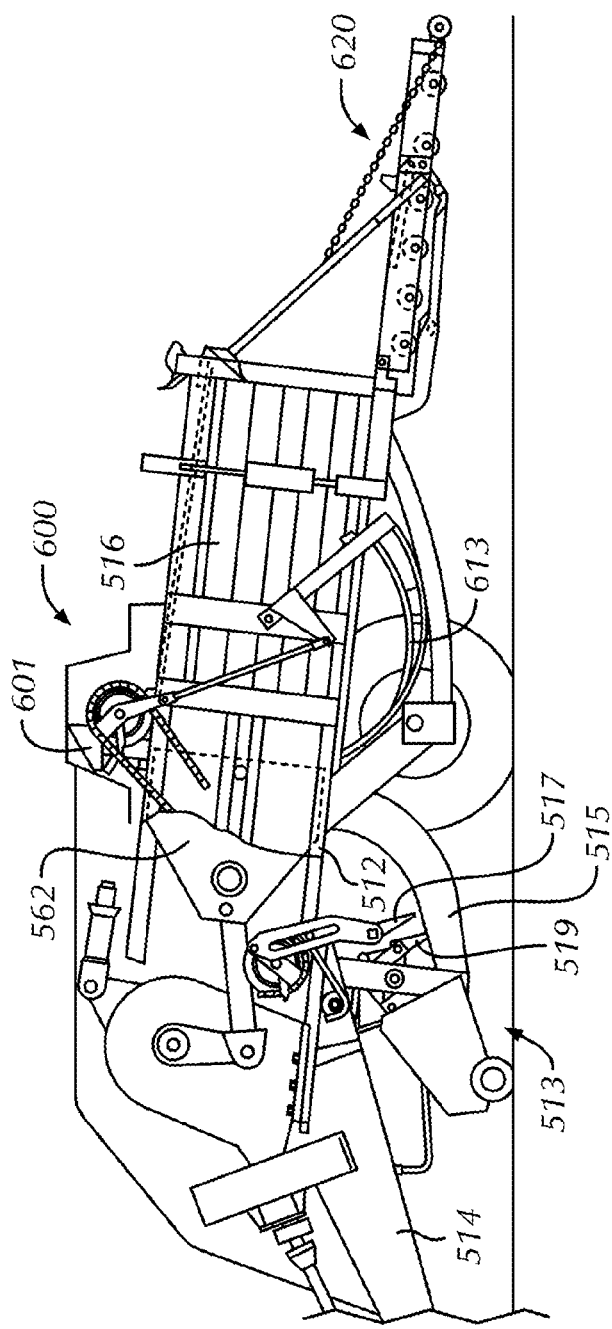
FIG. 1 shows a general outline of a baler (600) with a bale-forming chamber 516, a cyclically operating stuffer mechanism 517 and a plunger 562.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF THE INVENTION

The present invention will be described with respect to particular embodiments and with reference to certain drawings but the invention is not limited thereto but only by the claims.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Embodiments of the present invention provide for simple, cheap and robust methods and systems, to be used in balers, for determining the plunger load. Other embodiments relate to the use of such methods and systems for controlling such balers for various control objectives such as avoiding overload of the plunger (avoiding breakdown) and/or on-line steering of the density of the bales. In embodiments, the methods and systems presented may make use of an indirect way (instead of using direct measurement via e.g. a load sensor or a deformation sensor) of determining the plunger load by deriving from a measurement from another element of the baler a value representative for or an estimate of the load on the plunger. In one embodiment, speed of the flywheel is measured for determining the plunger load. A measurement at the flywheel indicates the total torque, required by the baler, which indicates the load of the machine together with the drive of all other systems. It is therefore a measure for instance for the load on the shear bolt of the machine. Alternative sensors are strain gauges on the baler frame, on the beam perpendicular to the driving direction or on the beam parallel to the driving direction.

For avoiding difficult to calibrate and complex set-ups the methods and systems presented use a measurement of a state of a drive element within the drive system of the plunger, e.g. the speed or velocity of such drive element. Moreover the invention describes the purposeful selection of the drive element to be chosen (e.g. the flywheel as it is less sensitive to disturbance from the activation of auxiliary functions like the stuffer and the knotter) in order to achieve a reliable representative value or estimate. The invention also describes how other signals (like the type of operation cycle, whether other auxiliary functions or components of the baler like knotter and stuffer are active or not, agricultural material characteristics) can be taken into account to increase the reliability of the methods presented.

To be able to determine or compute a value representative for or an estimate of the load on the plunger from another measurement (e.g. the speed of a drive element), a relationship between those must be established. Such relationship can be determined by measuring both the to-be estimated value and the other measurement and find a correlation between those (or mathematically manipulated derivatives thereof). Finding such relationship can be based on mathematical modeling of the behavior of the system under study (here the plunger—drive system interactions).

Figure 4:
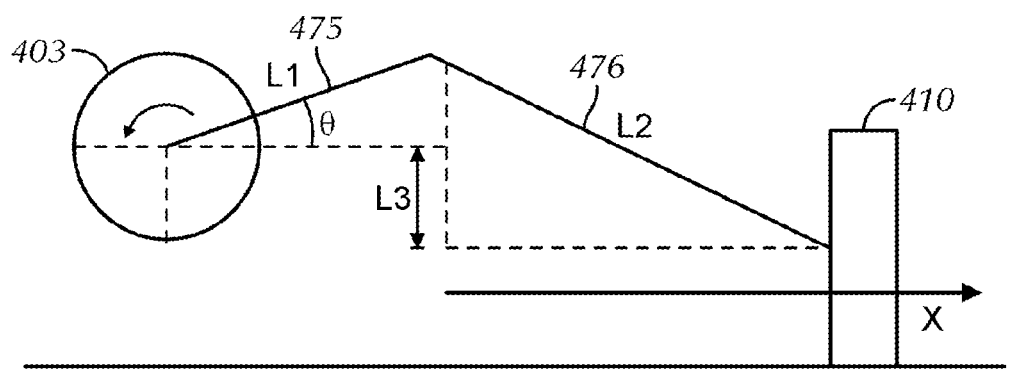
FIG. 4 shows a more detailed view on the flywheel (403) and plunger (410) interaction in the drive system (400).
Figure 5:
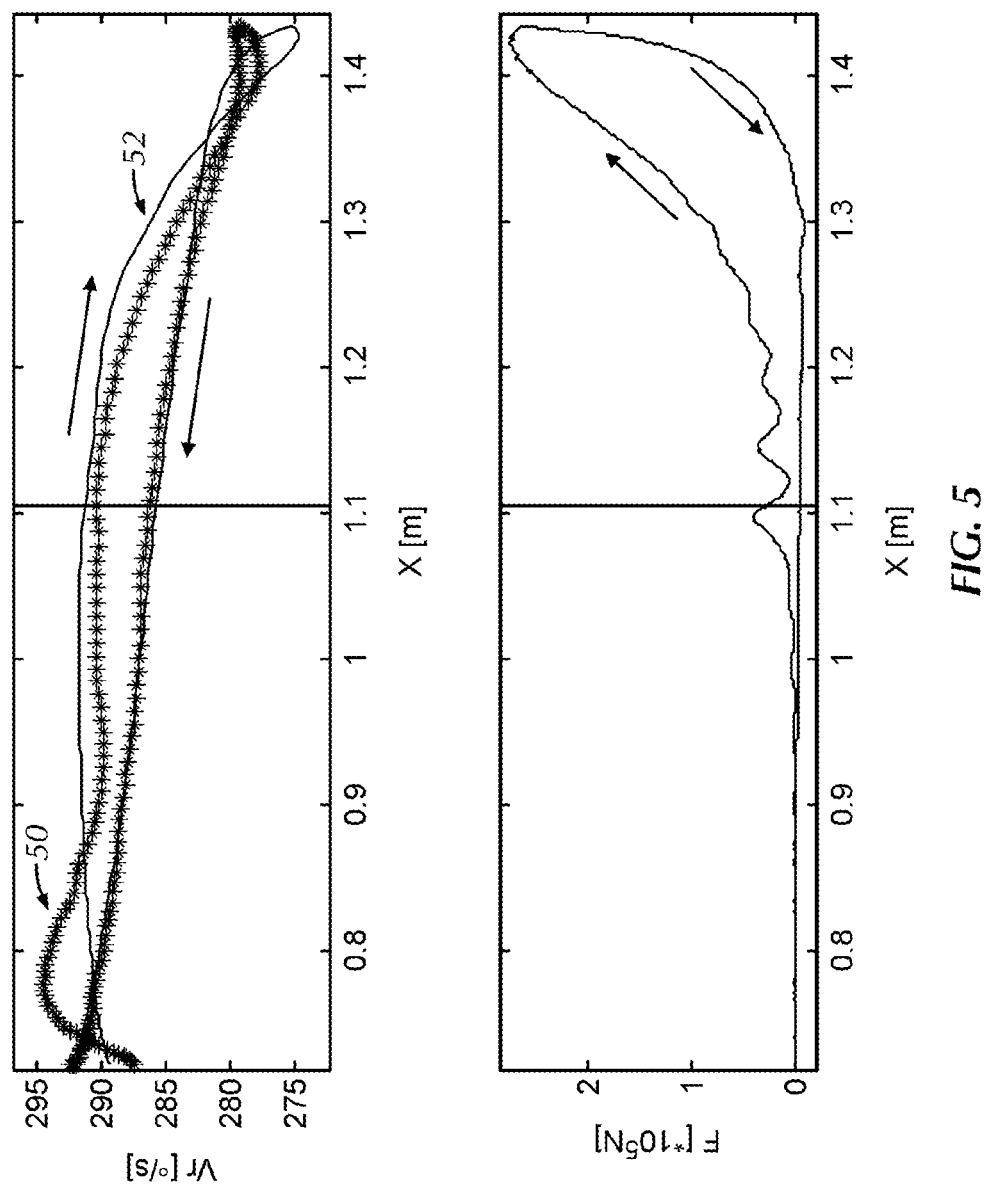
FIG. 5 shows in the top graph measurements of the rotational speed (e.g. derived either from the knotter operations or from the flywheel) as a function of the plunger position while the bottom graph shows measurement of the force on the plunger as a function of the plunger position.
Figure 6:
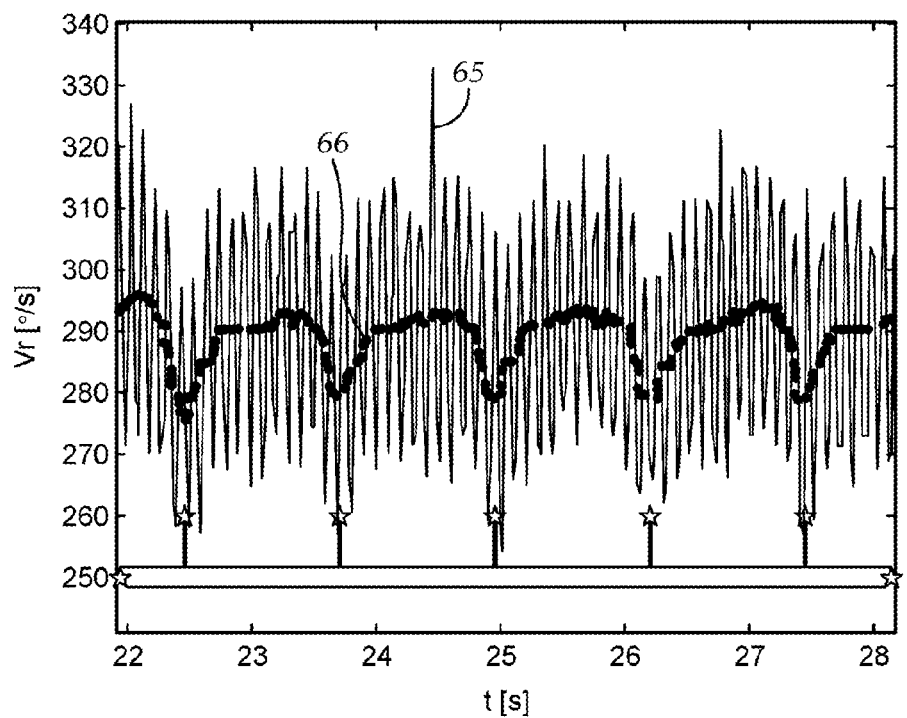
FIG. 6 shows the speed or velocity of the flywheel determined from the operation of the knotter (without filtering).

An example is given in FIG. 5 showing measurements of the rotational speed Vr (derived for instance from the knotter operations (crosses, graph 50) or from the flywheel (plain line, graph 52)) as a function of the plunger position X, and the measurement of the force (load) F on the plunger (as measured by two different sensors s1 and s2) as a function of the plunger position X. The vertical plain lines in the graphs indicate the start of compression (around 1.1 m along the X axis). It is clear that higher forces are observed when the rotational speed drops, so a correlation between force or load on the plunger and speed of an element of the drive system (e.g. the flywheel or knotter) can be determined FIG. 6 shows also a relation between the most rear point of the plunger (represented by the vertical line and the star approximately every 1.3 seconds), where the maximum load is expected, and velocity changes, derived from different elements, in particular the flywheel (dashed line, graph 66), being part of the plunger drive system but also an alternative using measurements on the knotter, optionally after use of (low pass) filtering or averaging (see graph 65 for the knotter and graph 66 for the flywheel). The most rear point (or distal position) of the plunger corresponds to the situation in FIG. 4 where the angle between L1 and L2 is 180°. FIG. 4 further shows a driving element 403 in a gearbox 419, a crank comprising two arms 475, 476 with respective lengths L1 and L2, and a plunger 410. A first arm 475, having a length L1, is attached by a first extremity to the driving element 403 and by a second extremity to a second arm 476. The second arm 476, having a length L2, is attached by a first extremity to the first arm 475 and by a second extremity to the plunger 410. L3 is the vertical distance between the first extremity of the first arm 475 and the second extremity of the second arm 476. X is the direction along which the location of the plunger 410 is measured.

Figure 7:
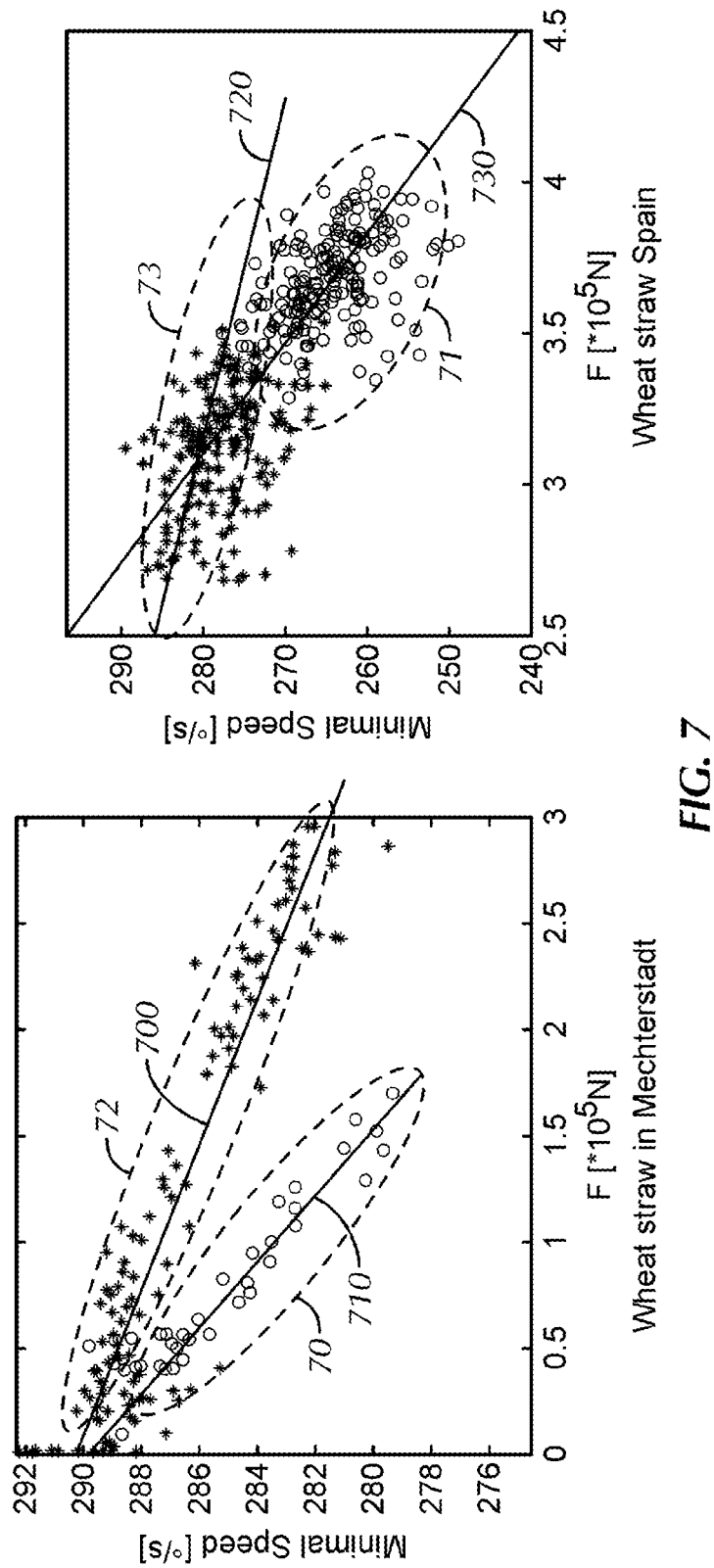
FIG. 7 shows the speed of the flywheel in function of the load on the plunger, depending on type of cycle (active, passive) and measured for two different types of agricultural material, wheat straw in Mechterstadt and wheat straw in Spain, respectively. The linear correlation between those is represented by the straight lines (700, 710, 720, and 730).

As indicated in FIG. 7, correlations represented by the straight lines 700, 710, 720, and 730 between the speed and force values can be determined. The circles indicated in regions 70 and 71 represent the situation where the strokes are active while the crosses indicated in regions 72 and 73 represent the situation where the strokes are passive. It is obvious that instead of a first order relationship (straight line) also more complicated functions (higher order polynomials or other techniques for fitting curves like neural networks, spline functions or other) can be used to represent or model the relationship.

Figure 2:
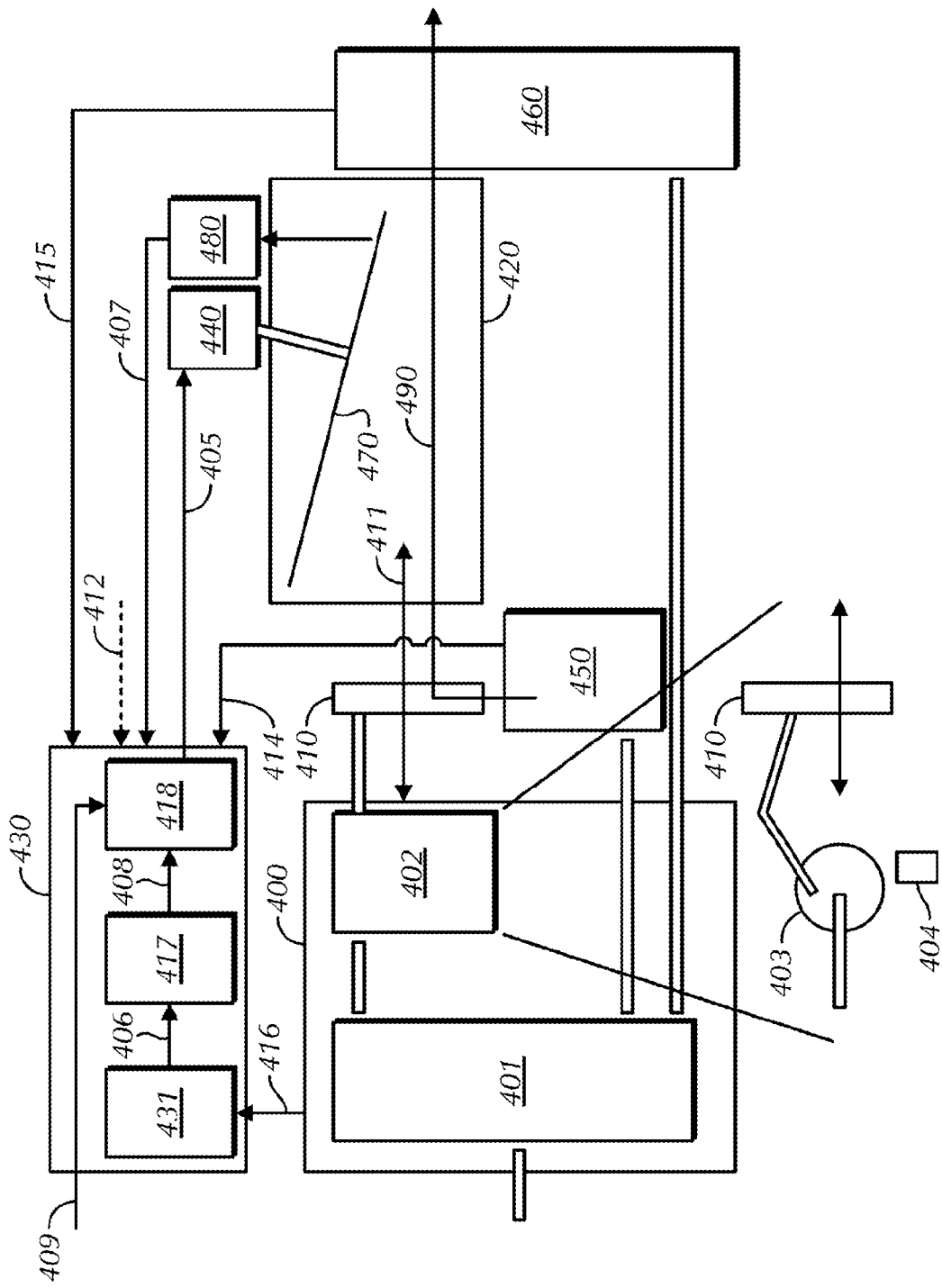
FIG. 2 shows a schematic view of an entire baler system according to an embodiment of the present invention.
Figure 3:
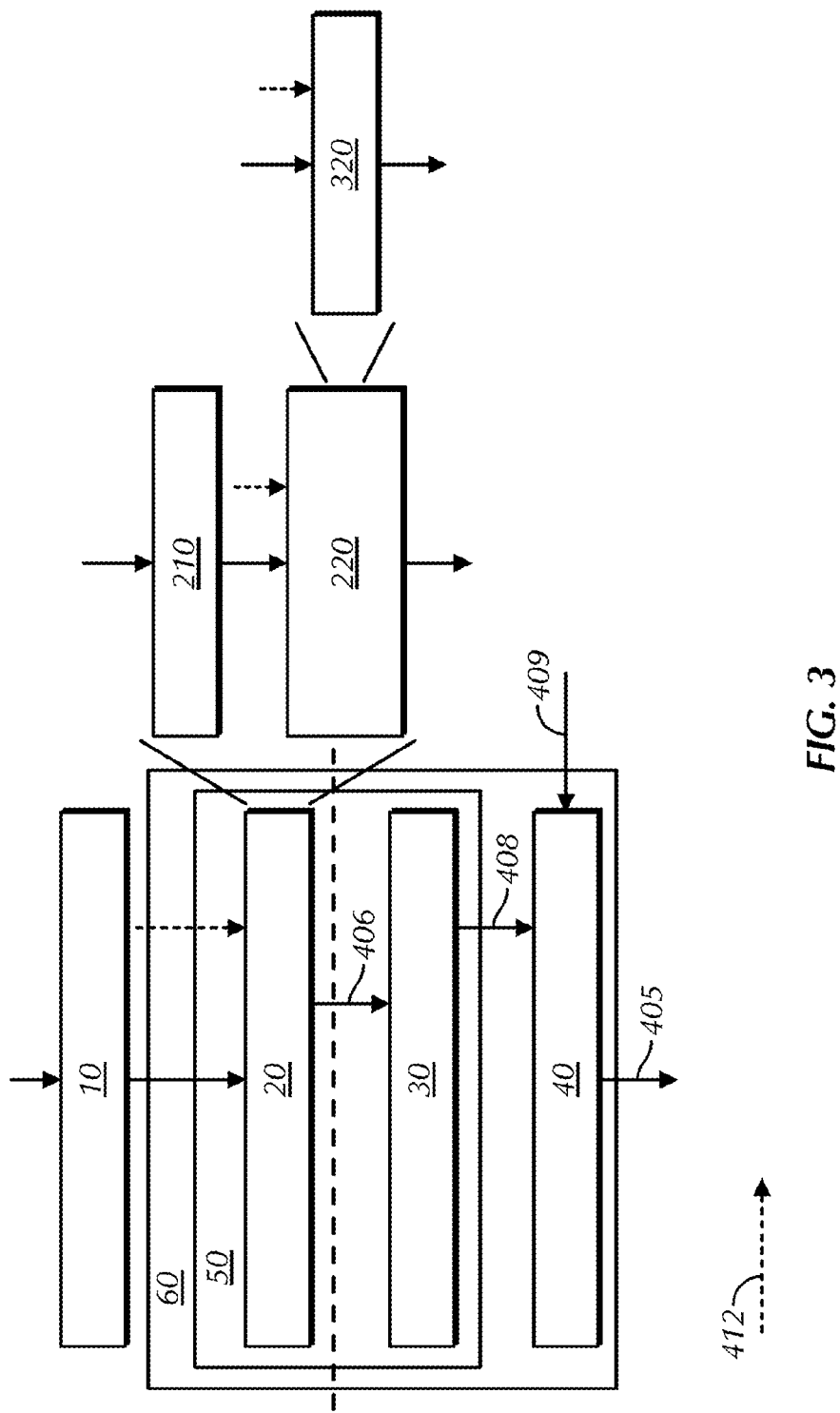
FIG. 3 shows a flow chart of an embodiment of the invention wherein a control signal to be applied to at least one controllable element in the baler is determined.

We now refer to FIGS. 2 and 3. FIG. 2 shows a schematic view of an entire bale system with the baler 420 with its internal bale forming chamber, the stuffer 450, a knotter 460, the plunger 410 and its reciprocating movement 411 and the crop and bale movement direction 490. Also shown is the plunger drive system 400 with a first 401 and second 402 sub-drive system. A system or electronic device 430 for determining at least one control signal 405 is illustrated. This system or electronic device 430 for determining at least one control signal 405 comprises a system or electronic device 431 for determining a value 406 representative for (e.g. an estimate of) the load on the plunger 410, a system or electronic device 417 for determining a value 408 representative of the maximum load determined by system or device 431, a system or electronic device 418 for comparing a reference maximum load 409 with the value 408 representative of the maximum load determined by the system or device 431. The bale system comprises at least one controllable element 470 of the baler, inside the bale chamber (for controlling the load) and its actuator 440, fed by the control signal 405. A possible realization of the second drive sub-system 402 is with a flywheel 403 driving the plunger 410, and a sensor 404 measuring the speed 416 of the flywheel 403. A means 480 is provided for measuring within the bale chamber the current cycle type (active or passive) 407 of the baler 420. Also represented are a signal 414 of the operational state of the stuffer, a signal 415 for the operational state of the knotter, and a signal 412 reflecting characteristics of the agricultural material, said signals being fed to the system or electronic device 430.

Once the relationship is determined (e.g. as illustrated in FIG. 7), a method for determining a value 406 representative for or an estimate of the load on a plunger 410 of a baler 420, can be proposed with a step of obtaining or measuring or sensing 10 the speed or velocity of movement 416 of the drive element 403; and determining 20 (or computing) the estimate 406 of the load on the plunger 410 based on the obtained speed of movement 416 of the drive element 403 by use of a predetermined relationship 220 between this speed of movement 416 of the drive element 403 and the load 406 on the plunger 410. Indeed, once the speed of movement 416 of the drive element 403 is available, one can determine the corresponding load 406 on the plunger by selecting from the stored relationship the corresponding value either by computing when the relationship is stored as a mathematical function or by retrieving a corresponding value from a stored table of values or even by use of more complicated computations as described further.

As the above methods when used for on-line control are executed in real-time, those methods may be executed by electronic devices or systems, which might be specifically designed for that purpose or may be general-purpose electronic devices in combination with instructions for carrying out the methods as described. As shown in the flow chart of FIG. 3 a step 10 of obtaining, inputting, measuring or sensing the speed of movement of one drive element with the relevant means 404 is followed by a step 20 of determining or computing a value 406 representative for or an estimate of the load on the plunger 410 with the relevant means 431. This value 406 can then e.g. be displayed in the cabin of the baler operator. Optionally one can determine 30 the maximum load 408 with the relevant means 417 and e.g. display this maximum value 408. Or optionally one determines 40 a control signal 405 to be applied to at least one controllable element in the baler 420, e.g. by comparing this maximum value 408 with the maximum reference value 409. The steps 20, 30 can be merged into one step 50. With a proper model of the system, also the steps 20, 30 and 40 can be merged into one step 60. Therefore the estimation method fits within methods of determining a control signal for controlling the load on a plunger 410 of a baler 420 and within methods for controlling the load on a plunger 410 of a baler with at least one controllable element 470 for controlling said load, steered by an actuator 440, by applying the control signal to the actuator 440 of the controllable element 470. It is to be noted that determining the maximum value 408 of the load on the plunger 410 can be realized by continuous use of the method (or at least performing sufficient sampling) and storing the value if it is the highest observed so far (with a refresh each cycle) or one can select a representative sample time e.g. when the plunger 410 has reached its most rear point or whatever other position considered representative.

As further shown in FIG. 3, one possible embodiment of the invention includes a step 210 of filtering the obtained measurements, e.g. by a low pass filtering, to avoid noisy signals. As further shown in FIG. 3, the predetermined relationship can be a static model 320, e.g. a linear (one- or multi-dimensional) function. Also indicated in FIG. 3 is the possibility to feed in agricultural material parameters 412 (either measured on-line e.g. by means of a humidity sensor, or input by the operator). Indeed, one may store multiple predetermined relationships—one for each agricultural material condition—or may even use a multi-dimensional function representation showing load on plunger versus speed of the drive element and agricultural material condition. In such embodiments the predetermined relationship is selected in accordance with obtained agricultural material characteristics of the agricultural material being baled by the baler 420.

Figure 8:
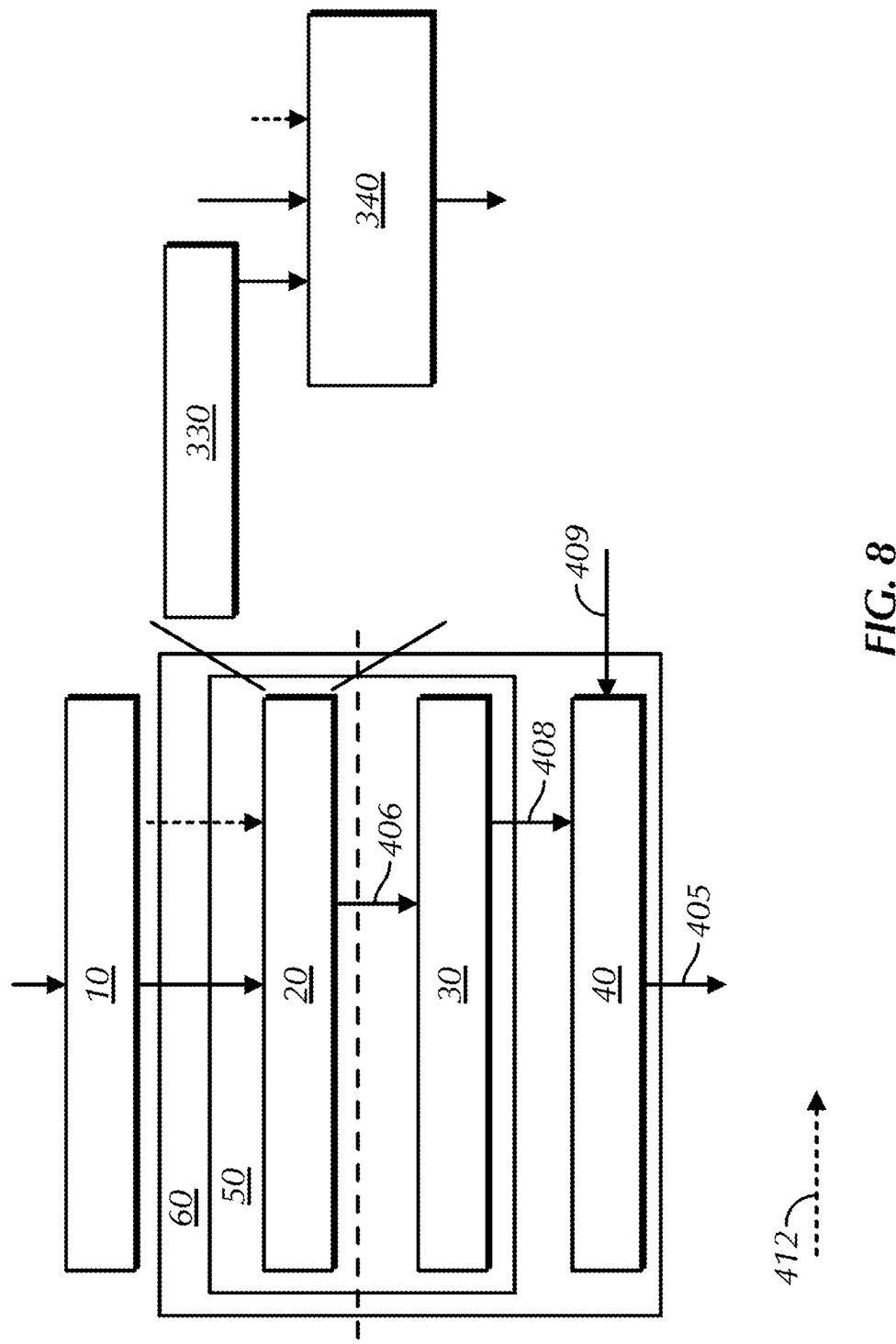
FIG. 8 shows a flow chart of an embodiment of the present invention wherein at least two predetermined relationships are used, and one is selected depending on the condition of an active or passive cycle.

As shown in FIG. 7 there is a difference in behavior of the system when an active cycle or passive cycle is considered. With an active cycle is meant that the plunger is moving and compressing agricultural material, while during a passive cycle agricultural material is moved without substantially compressing it—there is still some compression in such cycle due to expansion of the material when the plunger retracts after an active cycle. FIG. 8 shows an alternative embodiment, wherein one selects 340 the predetermined relation in accordance with the determined condition 330, being an active or passive cycle. Of course this embodiment can easily be combined with embodiments feeding in agricultural material characteristics. The determining of an active or passive cycle can e.g. be determined based on measurements within the bale chamber of the baler.

As indicated above the selection of the drive element to be used for measuring and later determining the estimate of the load can be done in view of the sensitivity of disturbing effects. As in such balers the driving force, externally coming from the tractor pulling the baler, has to supply force to the baler, the knotter and/or the stuffer, typically such drive systems have a first sub system 401, splitting the force of the baler plunger operations and these other components, the force directed to the plunger then being used in a second drive subsystem 402. In an embodiment of the invention the selected drive element is part of the second drive subsystem.

As the speed (and speed changes) changes with the net available torque at the drive system (gearbox, flywheel), correcting the predetermined relationship with possible influences thereon yields a higher reliable method. Taking into account active or passive cycles is one such correction. Taking into account whether the other components like knotter and stuffer are actually operational (and hence using some of the externally delivered force) and using this information, e.g. again to select between a relationship in one case and another relationship in the other case, is another example of such a correction mechanism. In embodiments, the method may then be further characterized in that the step of determining the load of the plunger takes into account the indicative signal (e.g. obtained via another sensor attached to such components) related to the operation of those components. Both correction mechanisms are compatible and even combinable with the use of agricultural material characteristic information.

The relationship between the available torque (and hence the link to the external force supplied by the tractor and the influence of the other components like stuffer and knotter on this torque), the dynamic effect of previous cycles, gravity and the load on the plunger can be modeled by a set of mechanical equations, including the load on the plunger and the velocities, e.g. of the flywheel.

The relation between the torque to drive the plunger and the load on the plunger is derived from the relations for the available power at the gearbox Pg and the resulting power at the plunger Pp.

The power at the gearbox is written as:

$$P_p = F\dot{x}$$

wherein F is the load on the plunger due to compression and moving its own mass and $\dot{x}$ is the velocity of the plunger in m/s.

The available power at the gearbox is written as:

$$P_g = T\dot{\theta}$$

wherein T is the available torque to drive the plunger and $\dot{\theta}$ is the angular velocity of plunger arm L1 (FIG. 4). The relation between the plunger position and the angle of plunger arm L1 is given by:

$$x = l_1 \cos(\theta) + (l_2^2 - (l_3 + l_1 \sin(\theta))^2)^{1/2}$$

wherein l1, l2 and l3 are the lengths given in FIG. 4. This relation is derived with respect to time and is then filled in, into the relation for Pp. When neglecting the friction for driving the plunger, the power Pp at the plunger and the power Pg at the gearbox are equal, and the load of the plunger is calculated as:

$$F = \frac{T\dot{\theta}}{\dot{x}} = \frac{T}{-L_1 \sin(\theta) + \frac{1}{2} \frac{-2(L_3 + L_1 \sin(\theta))}{(L_2^2 - (L_3 + L_1 \sin(\theta))^2} L_1 \cos(\theta)}$$

The connection between the rotation of the flywheel and the angular rotation of arm L1 is fixed by the gears in the main gearbox. Therefore, the rotation speed of arm L1 ($\dot{\theta}$) is immediately measured by the rotation speed of the flywheel.

Figure 9:
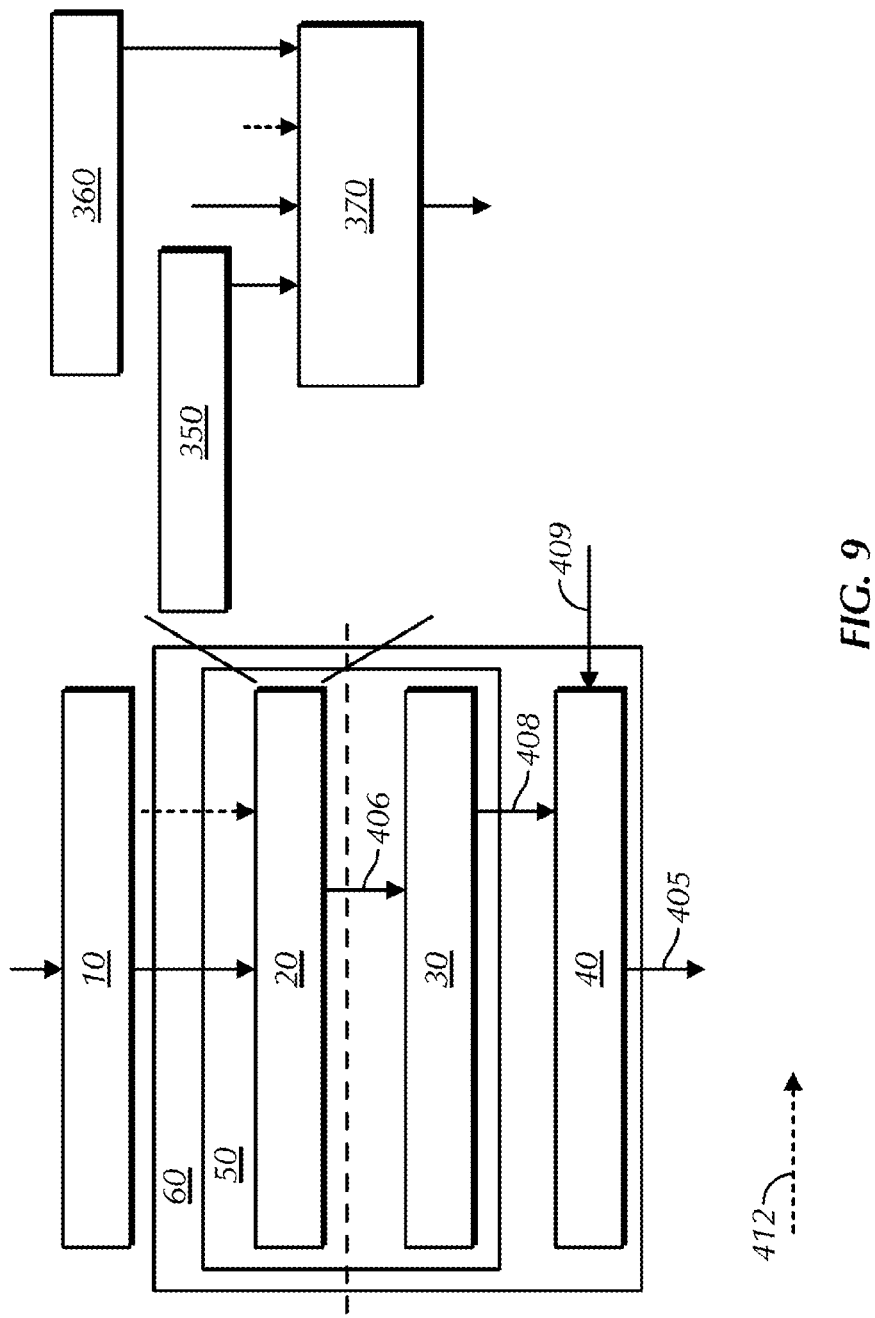
FIG. 9 shows a flow chart of an embodiment of the present invention based on an estimator based on a dynamic model of the drive system.

In an alternative to the use of the static relationship (or relationships plus relationship selection) described above, one can build also on a dynamic model of the system under consideration, a model-based estimator, based on principle of model-based control theory. Such estimator feeds in a difference between the measured velocity and a computed velocity and is designed in such a way that the measured velocity and computed velocity converge to each other. The load on the plunger can be considered as an extra parameter to be estimated by the estimator. This embodiment is illustrated by the flowchart of FIG. 9 which is similar to FIG. 8 except that step 20 comprises a step 370 of using an estimator based on a dynamic model. The step 350 is a step where other baler system signals are input and step 412 is a step where agricultural characteristics are optionally input. The further advantage of this approach is that the factors considered for correction in the static approach, here can be included in a more natural way. Indeed the previous cycle is part of the dynamics of the model while the external torque can be made variable and hence dependent on the operations of the knotter and stuffer. One might even include a simple compression model of the agricultural material, to correct for the active-passive cycle difference. Once the techniques of model-based control are used, one can similarly construct the control signals based on such model.

Aspects of the invention also provide for electronic device 431 used in a baler for determining an estimate of the load on a plunger 410 of the baler, the electronic device being adapted for executing any of the methods discussed above. Such electronic device can be embedded in a system used in a baler, the system comprising an electronic device 431 for determining a value representative of or an estimate of the load on a plunger 410 of the baler driven by a drive system 400 with at least one drive element 403. The electronic device comprises a means (e.g. an input port) for obtaining 10 the speed of movement of the drive element 403; a storage means (any storage or memory device) for storing data about a predetermined relationship between the speed of movement of the drive element 403 and the load on the plunger 410; and a computation means (e.g. a CPU or dedicated data path in an ASIC) for determining 20 the value representative of or the estimate of the load on the plunger 410 based upon the obtained speed of movement of the drive element 403 by use of the stored predetermined relationship 220 between this speed of movement of the drive element 403 and the load on the plunger 410. The system may further comprise a sensor 404, operatively connected (wired or wireless) to the electronic device 431 and used for measuring the speed of movement of the drive element 403.

Aspects of the invention further provide for an electronic device 430 for determining a control signal for controlling the load on a plunger 410 of a baler, adapted for executing control methods described before. Such electronic device may be embedded in a system further being adapted for determining a control signal for controlling the load on a plunger 410 of a baler for harvested agricultural material, the system comprising an electronic device 430, comprising the electronic device 413, a storage means (any storage or memory device) for storing a reference maximum load of the plunger 410 and computation (e.g. a CPU or dedicated data path in an ASIC) means for determining 40 a control signal based on the obtained value representative for or an estimate of the load on the plunger 410 by use of a comparator for comparing the obtained value representative of or an estimate of the load of the plunger 410 with the stored reference maximum load of the plunger 410. The system may further be adapted for controlling the load on a plunger 410 of a baler, the system comprising: one controllable element 470 of the baler; and an actuator (hydraulic, pneumatic or electronic) 440, operatively connected (wired or wireless) to the controllable element 470 for steering in accordance with the control signal.

Figure 10:
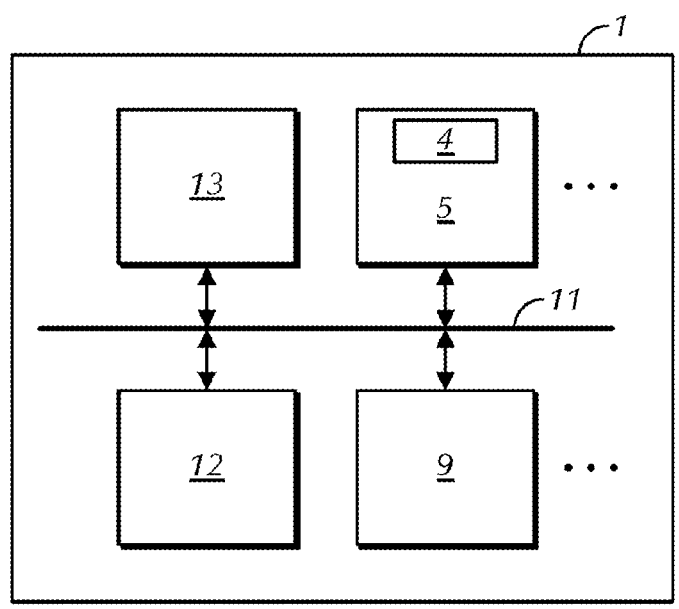
FIG. 10 shows a processing system including the instructions to implement aspects of the methods according to embodiments of the present invention.

The above-described method embodiments of the present invention may be implemented in a processing system 1 such as shown in FIG. 10. FIG. 10 shows one configuration of processing system 1 that includes at least one programmable processor 13 coupled to a memory subsystem 5 that includes at least one form of memory, e.g., RAM, ROM, and so forth. It is to be noted that the processor 13 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system 1 may include a storage subsystem 12 that has at least one input port (e.g. disk drive and/or CD-ROM drive and/or DVD drive). In some implementations, a display system, a keyboard, and a pointing device may be included as part of a user interface subsystem 9 to provide for a user to manually input information. Ports for outputting data also may be included. More elements such as network connections, interfaces to various devices, and so forth, may be included, but are not illustrated in FIG. 10. The various elements of the processing system 1 may be coupled in various ways, including via a bus subsystem 11 shown in FIG. 10 for simplicity as a single bus, but will be understood to those in the art to include a system of at least one bus. The memory of the memory subsystem 5 may at some time hold part or all (in either case shown as 4) of a set of instructions that when executed on the processing system 1 implement the steps of the method embodiments described herein. Thus, while a processing system 1 such as shown in FIG. 10 is prior art, a system that includes the instructions to implement aspects of the methods for determining a value representative for the load on a plunger of a baler, or of the methods of determining a control signal for controlling said load, or of the methods of controlling said load is not prior art, and therefore FIG. 10 is not labeled as prior art.

The present invention also includes a computer program or computer program product which provides the functionality of any of the methods according to the present invention when executed on a computing device. Such computer program product can be tangibly embodied in a carrier medium carrying machine-readable code for execution by a programmable processor. The present invention thus also relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program or computer program product can be carried on an electrical carrier signal. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fiber optics, including the wires that comprise a bus within a computer.

The invention claimed is:

1. A method for determining a value representative for a load on a plunger of a baler for forming bales of agricultural material, the baler comprising the plunger and a drive system for the plunger, the drive system comprising a drive element, the method comprising the steps of:
    obtaining a speed of movement of the drive element of the drive system for the plunger; and
    determining an estimate of the load on the plunger based upon the obtained speed of movement of the drive element by use of a predetermined relationship between the speed of movement of the drive element and the load on the plunger.

2. The method according to claim 1, wherein the predetermined relationship is a predetermined function between the load on the plunger and the speed of movement of the drive element.

3. The method according to claim 1, wherein the predetermined relationship is selected in accordance with obtained agricultural material characteristics of the agricultural material being baled by the baler.

4. The method according to claim 1, further comprising the step of:
    determining whether the plunger is operating under a first condition wherein the plunger is moving and compressing agricultural material in the baler or under a second condition wherein the plunger is only moving agricultural material in the baler without compressing the agricultural material in the baler; wherein the predetermined relationship is selected in accordance with the determined condition.

5. The method according to claim 1, wherein the drive system for the plunger comprises a first subsystem and a second subsystem, wherein the first subsystem is capable of obtaining an external driving force and adapted for directing a portion of the external driving force to the second subsystem specific for the plunger, and wherein the drive element is part of the second subsystem.

6. The method according to claim 1, further comprising the step of:
obtaining a signal indicative of whether at least one other bale component that is operatively connected to the drive system is actually driven by the drive system when the step of determining the load of the plunger is performed, wherein the step of determining the load of the plunger is further based on the indicative signal.

7. The method according to claim 1, whereby the predetermined relationship is based on a set of differential equations describing at least dynamics of the plunger and dynamics of the drive system, the equations including the load on the plunger and a rate of change of the speed of movement of the drive element.

8. The method according to claim 7, wherein a model-based estimator is used for determining a value representative of the load of the plunger, the model being based on the set of differential equations.

9. The method according to claim 1, wherein the drive system further comprises a flywheel operatively connected to the plunger, and wherein the drive element is the flywheel.

10. A method for use in controlling a load on a plunger of a baler, the method comprising the steps of:
obtaining a speed of movement of a drive element of a drive system for the plunger;
determining a value representative of the load on the plunger based upon the obtained speed of movement of the drive element by use of a predetermined relationship between the speed of movement of the drive element and the load on the plunger; and
determining a control signal for controlling the load on a plunger of a baler based on the determined value representative of the load on the plunger.

11. The method according to claim 10, further comprising a step of controlling the load on the plunger using at least one controllable element, steered by an actuator, by applying the determined control signal to the actuator of the controllable element.

12. A control system for a baler comprising a plunger and a driving system having at least one drive element for driving the plunger, the system comprising
an electronic device configured for determining a value representative of a load on the plunger of the baler, the electronic device configured for obtaining a speed of movement of the at least one drive element;
wherein the electronic device comprises a data storage configured for storing data about a predetermined relationship between the speed of movement of the at least one drive element and the load on the plunger; and
wherein the electronic device is further configured for determining the value representative of the load on the plunger based upon the obtained speed of movement of the at least one drive element by use of the stored predetermined relationship between the speed of movement of the at least one drive element and the load on the plunger.

13. The system according to claim 12, further comprising a sensor, operatively connected to the electronic device, the sensor for measuring a speed of movement of the at least one drive element and providing the speed of movement of the at least one drive element to the electronic device.

14. The system according to claim 12, wherein the electronic device is further configured for determining a control signal for controlling the load on the plunger of the baler, wherein the data storage is further configured for storing a reference maximum load of the plunder, and wherein the electronic device is further configured for determining a control signal based on the determined value representative of the load on the plunger by use of a comparator for comparing the determined value representative of the load of the plunger with the stored reference maximum load of the plunger.

15. The system according to claim 14, wherein the electronic device is further configured for controlling the load on the plunger of the baler.

* * * * *